(12) United States Patent
Silkebakken et al.

(10) Patent No.: US 7,937,710 B1
(45) Date of Patent: May 3, 2011

(54) CONTEXT SWITCH SIGNALING METHOD AND SYSTEM

(75) Inventors: Richard A. Silkebakken, Santa Clara, CA (US); Robert C. Keller, Palo Alto, CA (US); Benjamin J. Garlick, Sunnyvale, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1562 days.

(21) Appl. No.: 11/284,609

(22) Filed: Nov. 22, 2005

(51) Int. Cl.
*G06F 9/46* (2006.01)
(52) U.S. Cl. .................... 718/108; 718/100; 718/107
(58) Field of Classification Search .............. 718/108, 718/100, 104
See application file for complete search history.

(56) References Cited

U.S. PATENT DOCUMENTS

| | | | |
|---|---|---|---|
| 5,613,114 A * | 3/1997 | Anderson et al. | 718/108 |
| 5,659,750 A * | 8/1997 | Priem et al. | 718/108 |
| 6,055,559 A * | 4/2000 | Shimizu et al. | 718/107 |
| 6,061,711 A * | 5/2000 | Song et al. | 718/108 |
| 6,128,641 A * | 10/2000 | Fleck et al. | 718/108 |
| 6,205,468 B1 * | 3/2001 | Diepstraten et al. | 718/108 |
| 6,223,208 B1 * | 4/2001 | Kiefer et al. | 718/108 |
| 6,408,325 B1 * | 6/2002 | Shaylor | 718/108 |
| 6,895,583 B1 * | 5/2005 | Koning | 718/100 |
| 7,313,797 B2 * | 12/2007 | Sundaram et al. | 718/108 |
| 7,373,646 B1 * | 5/2008 | Smith | 718/108 |
| 2006/0100986 A1 * | 5/2006 | MacPherson | 707/2 |
| 2007/0136733 A1 * | 6/2007 | Park et al. | 718/108 |

* cited by examiner

*Primary Examiner* — Meng-Ai An
*Assistant Examiner* — Tammy Lee
(74) *Attorney, Agent, or Firm* — Patterson & Sheridan, LLP

(57) ABSTRACT

A context switch request is made from a host unit to a processing engine separately from the method stream to that processing engine and does not require the host unit to know what context the processing engine is currently working on. Upon receiving the request, the processing engine compares the requested context with the context that it is currently working on, and if the two are different, performs the context switch to the requested context. On the other hand, if the two are the same, the engine does not perform the context switch and continues working on the current context.

17 Claims, 4 Drawing Sheets

CONTEXT SWITCH SIGNALING METHOD AND SYSTEM

BACKGROUND OF THE INVENTION

1. Field of the Invention

Embodiments of the present invention relate generally to context switching and, more particularly, to a method and a system for signaling a context switch to a processing engine.

2. Description of the Related Art

A context switch is a feature of a multitasking operating system that allows for a switch in execution from one computing thread or process to another. This feature ensures that a processor cannot be monopolized by any one processor-intensive thread or process. During a context switch, the states of the processor of the currently running process are stored in memory and the processor is restored with states of another process that was previously stored in memory.

In graphics applications, a number of threads may be mutiprocessed through each of the different graphics engines that are part of a graphics processing unit (GPU).

FIG. 1 is a simplified block diagram of a computer system 100 that includes a GPU 120 that includes a host unit 122 and a plurality of processing engines 124-1, 124-2, 124-3, which may be, for example, a graphics engine, a video processing engine, and a display engine, respectively. The processing engines 124 have access to a local graphics memory 130 through a memory interface 126. The GPU 120 and the local graphics memory 130 represent a graphics subsystem that is accessed by a central processing unit (CPU) 110 of the computer system 100 using a driver that is stored in a system memory 112.

The host unit 122 is responsible for distributing methods to the processing engines 124. Each of the processing engines 124 places the stream of methods that it receives from the host unit 122 in a FIFO memory and processes the methods one after another through a processing pipeline. The host unit 122 is also responsible for scheduling the different threads through the processing engines 124 and for signaling the processing engines 124 to perform a context switch in accordance with that schedule.

To enable the context switching functionality, the processing engines of conventional computer systems are configured to broadcast to the host unit the context that they are currently working on. When the host unit desires to perform a context switch in a processing engine and determines that the context broadcast by that processing engine is different from the context that the host unit wants the processing engine to work on, the host unit places a context switch request in the method stream for that processing engine.

The processing engine, however, typically does not perform the context switch requested by the host unit immediately, because the processing engine cannot act on the context switch request until all other methods that are ahead of the context switch request in the method stream and stored in the FIFO memory, are moved out of the FIFO memory and sent down the processing pipeline. As a result, context switches carried out in the above manner are subject to highly variable delays. The host unit may be configured to keep track of such variable delays so that a more precise scheduling of context switches can be achieved, but such a technique is not desirable because it adds too much overhead to the host unit.

SUMMARY OF THE INVENTION

The present invention provides a context switch signaling method and system that enable precise scheduling of context switches without adding too much overhead to the host unit. According to an embodiment of the invention, the context switch request is made by the host unit to a processing engine separately from the method stream of that processing engine and does not require the host unit to know what context the processing engine is currently working on. When the host unit makes the context switch request to a processing engine, it suspends sending methods to the processing engine. It does not resume sending methods to the processing engine until an acknowledgement signal is received from the processing engine. Upon receiving the request, the processing engine compares the requested context with the context that it is currently working on, and if the two are different, performs the context switch to the requested context. After the context switch, the processing engine issues an acknowledgement signal to the host unit which, in response, begins sending methods for the new context to the processing engine. On the other hand, if the two are the same, the processing engine does not perform the context switch and immediately sends back an acknowledgement signal to the host unit which, in response, resumes sending methods for the current context to the processing engine.

The system that implements the context switch signaling method described above, according to an embodiment of the present invention, includes a host unit for managing context switches, and a processing engine, coupled to the host unit, that includes a memory unit for a first pointer, a memory unit for a second pointer, and a logic unit for comparing the first and second pointers. The first pointer is received from the host unit in connection with a context switch request and represents the new context. The second pointer represents the current context that the processing engine is working on. The processing engine compares the first pointer and the second pointer and performs a context switch to the new context if the first pointer is different from the second pointer. If the first pointer is the same as the second pointer, this means that the processing engine is already working on the new context, and therefore, the processing engine does not perform a context switch.

By using the methods and systems according to various embodiments of the present invention, context switching may be scheduled by the host unit and carried out by the processing engine with precise timing. The solution provided by the present invention is advantageous because the decision regarding whether or not to perform a context switch is made locally at the processing engines. The host unit merely issues a request to context switch to a desired context and thus any overhead increase in the host unit is minimal.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the detailed description of the embodiments of the present invention provided herein, a context represents the states of a processing engine that is executing a particular thread or process. Contexts are stored in a context buffer, which is typically in the form of random access memory (RAM). A pointer for a particular context (or a context pointer, for short) represents a pointer to a memory region in the context buffer that has been reserved for storing the states of that particular context.

Figure 1:
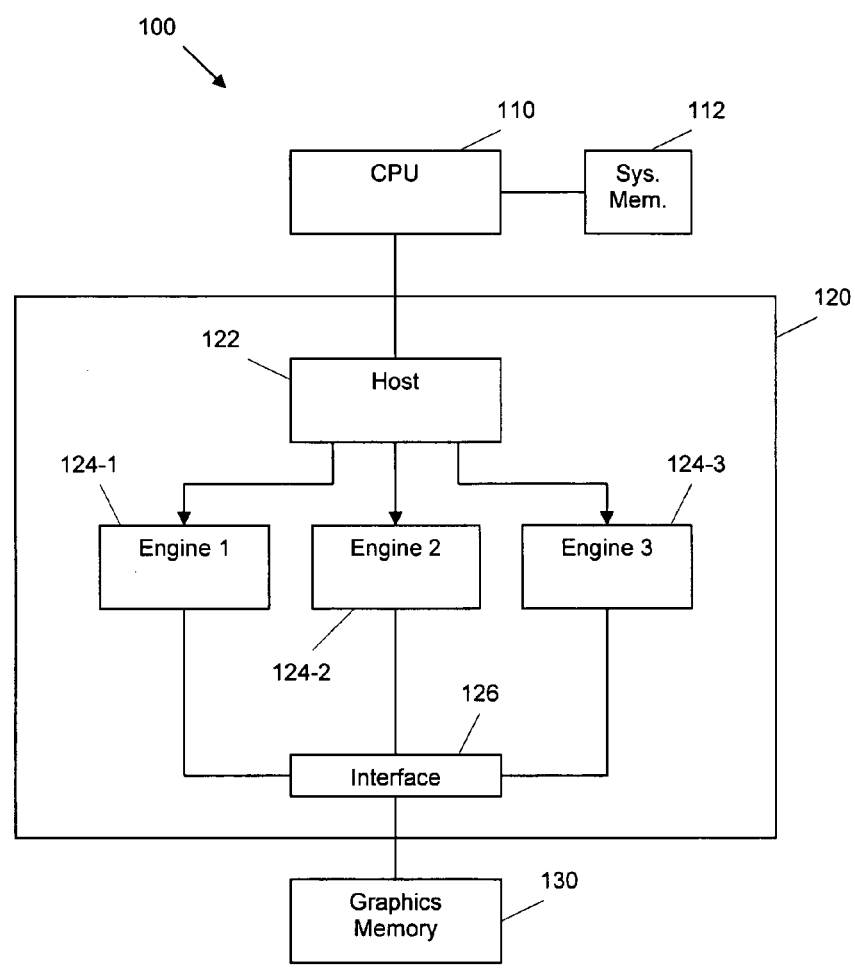
FIG. 1 is a simplified block diagram of a computer system implementing a GPU with a plurality of processing engines.
Figure 2:
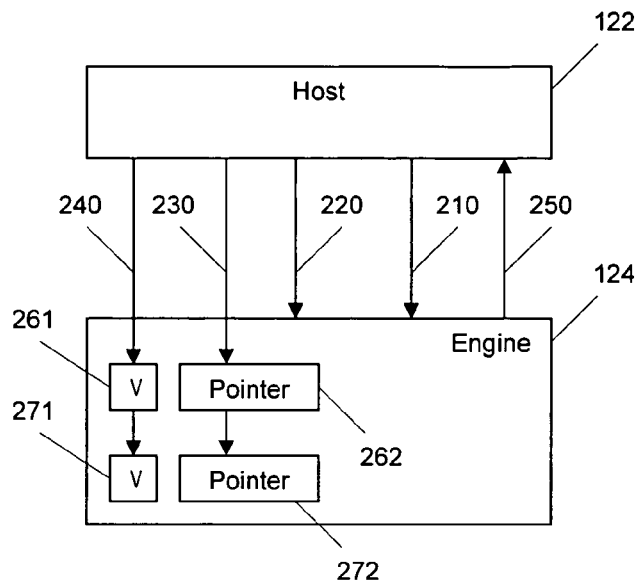
FIG. 2 is a block diagram showing a host unit and a processing engine and connections between the two that are used in signaling a context switch according to an embodiment of the present invention.

FIG. 2 is a block diagram showing a host unit 122 and a processing engine 124 and connections between the two that are used in signaling a context switch according to an embodiment of the present invention. The processing engine 124 is representative of any one of the processing engines 124-1, 124-2, 124-3 shown in FIG. 1. The connections between the host unit 122 and the processing engine 124 include a connection 210 representing the method data bus through which methods from the host unit 122 flow to the processing engine 124, a connection 220 through which a context switch request is signaled from the host unit 122 to the processing engine 124, a connection 230 through which a pointer associated with a target or desired context is communicated by the host unit 122 to the processing engine 124, a connection 240 through which the level of a valid bit is communicated by the host unit 122 to the processing engine 124, and a connection 250 through which the processing engine 124 acknowledges to the host unit 122 that the requested context switch has been performed.

The processing engine 124 as illustrated in FIG. 2, includes register memory units 261, 262, 271 and 272. The memory unit 261 stores the level of the valid bit communicated by the host unit 122. The memory unit 262 stores the pointer that is associated with the target or desired context as communicated by the host unit 122. Thus, the memory units 261, 262 store new data communicated from the host unit 122 in connection with a context switch request that is made through the connection 220. The memory units 271, 272 reflect data associated with the context that is currently being executed by the processing engine 124. The memory unit 271 stores the level of the valid bit associated with the current context and the memory unit 272 stores the pointer associated with the current context.

The pointer is an n-bit value that uniquely identifies a particular context. In a physically addressed system, the pointer may be a 20-bit value that points to a location in memory, e.g., local graphics memory 130, that has been reserved for the context associated with the pointer. In a virtually addressed system, the pointer may be a 16-bit value that denotes a particular virtual addressing space that has been reserved for the context associated with the pointer. Also, in the embodiments of the present invention described herein, each pointer has an associated valid bit. A valid bit value of zero means that the pointer (and the context associated with the pointer) is invalid and a valid bit value of one means that the pointer (and the context associated with the pointer) is valid. The pointers start out as invalid upon start-up of the processing engine 124.

When the processing engine 124 receives a context switch request over the connection 220, it stores the pointer communicated over the connection 230 into the memory unit 262 and the value of the valid bit communicated over the connection 240 into the memory unit 261. The processing engine 124 carries out different steps in response to the context switch request depending on the valid bit values stored in memory units 261, 271 and the pointers stored in the memory units 262, 272.

Figure 3:
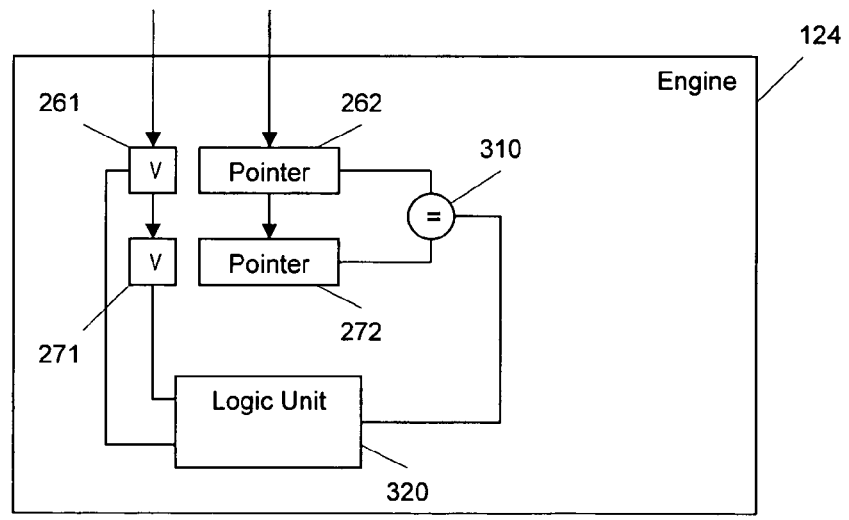
FIG. 3 illustrates components of a processing engine that process a context switch request from a host unit.

FIG. 3 illustrates components of a processing engine 124 that process a context switch request from a host unit 122. The components include a comparison unit 310 and a logic unit 320. The comparison unit 310 examines the pointers stored in the memory units 262, 272 for equality. The logic unit 320 examines the valid bits stored in the memory units 261, 271 and the output of the comparison unit 310.

If neither the current context nor the new context is valid, the processing engine 124 issues an acknowledgement signal over the connection 250. The valid bit value and the current context stored in the memory units 271, 272 remain unchanged.

If the current context is not valid but the new context is valid, the processing engine 124 restores the new context using the pointer stored in the memory unit 262, moves the pointer in the memory unit 262 into the memory unit 272, sets the valid bit in the memory unit 271 to one, and issues an acknowledgement signal over the connection 250.

If the current context is valid but the new context is not valid, the logic unit 320 examines the output of the comparison unit 310. If this output level is high, indicating that the equality is true and that the pointers stored in the memory units 262, 272 are equal, the processing engine 124 saves the current context using the pointer stored in the memory unit 272, sets the value of the valid bit in the memory unit 271 to zero, and issues an acknowledgement signal over the connection 250. If this output level is low, indicating that the equality is false and that the pointers stored in the memory units 262, 272 are not equal, the processing engine 124 issues an acknowledgement signal over the connection 250, and the valid bit value and the current context stored in the memory units 271, 272 remain unchanged.

If both the current context and the new context are valid, the logic unit 320 examines the output of the comparison unit 310. If this output level is low, indicating that the equality is false and that the pointers stored in the memory units 262, 272 are not equal, the processing engine 124 saves the current context using the pointer stored in the memory unit 272, restores the new context using the pointer stored in the memory unit 262, moves the pointer in the memory unit 262 into the memory unit 272, sets the value of the valid bit in the memory unit 271 to one, and issues an acknowledgement signal over the connection 250. If this output level is high, indicating that the equality is true and that the pointers stored in the memory units 262, 272 are equal, the processing engine 124 issues an acknowledgement signal over the connection 250, and the valid bit value and the current context stored in the memory units 271, 272 remain unchanged.

Figure 4:
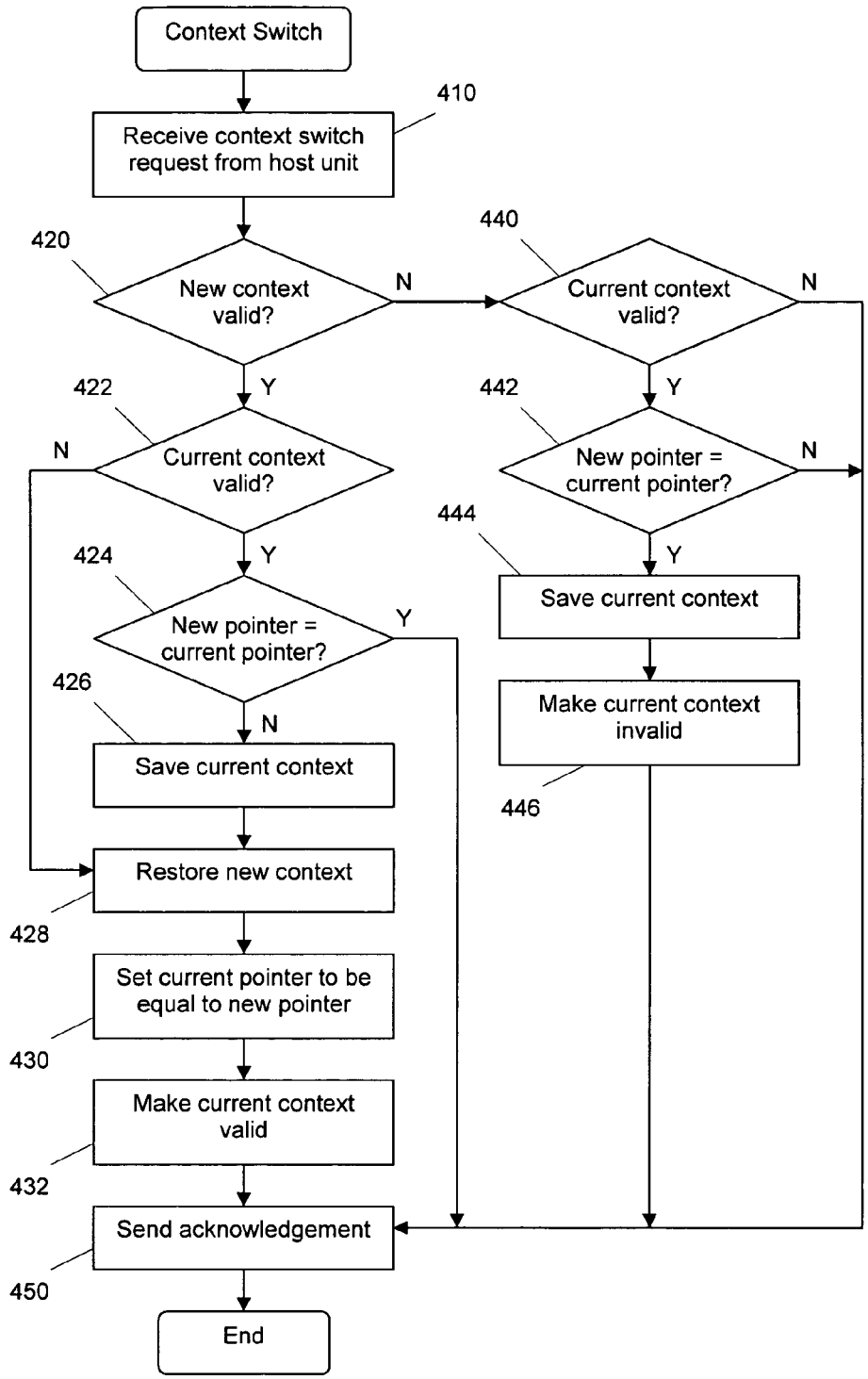
FIG. 4 is a flow diagram that illustrates the process steps carried out by a processing engine in response to a context switch request from a host unit.

FIG. 4 illustrates in a flow diagram the process carried out by the processing engine 124 when it receives a context switch request from the host unit 122. In step 410, the processing engine 124 receives a context switch request from the host unit 122 including a valid bit that is stored in the memory unit 261 and a new pointer that is stored in the memory unit 262. In steps 420, 422 and 440, the validity of the new and current contexts are checked.

If both the new and current contexts are valid, the new pointer stored in the memory unit 262 is compared with the current pointer that is stored in the memory unit 272 (step 424). If there is inequality, this means that the processing engine 124 needs to perform a context switch, and steps 426 through 432 and step 450 are carried out. First, the processing engine 124 saves the current context using the pointer stored in the memory unit 272 (step 426). In step 428, the processing engine 124 restores the new context using the pointer stored in the memory unit 262. Then, the pointer to the new context is moved into the memory unit 272 for the current context (step 430), and the current context is made valid (step 432). In step 450, the processing engine 124 issues an acknowledgement signal over the connection 250 to the host unit 122. If there is equality between the new pointer and the current pointer, this means that the processing engine 124 is already working on the new context, and so it is unnecessary to save the current context or to restore the new context, and flow proceeds directly to step 450, where the processing engine 124 issues an acknowledgement signal over the connection 250 to the host unit 122.

If the new context is valid but the current context is not, steps 428 through 432 and step 450, described above, are executed. In this case, there is no current context to save because the current context is not valid, and only the new context need to be restored.

In the case where the new context is invalid but the current context is valid, the host unit 122 has nothing new to schedule in the processing engine 124 and is attempting a flush of the context identified in the context switch request into memory. The new pointer is compared with the current pointer in step 442. If the new pointer does not equal the current pointer, the current context is not flushed and flow proceeds directly to step 450, where the processing engine 124 issues an acknowledgement signal over the connection 250 to the host unit 122. If the new pointer does equal the current pointer, the processing engine 124 saves the current context using the pointer stored in the memory unit 272 (step 444), and makes the current context to be invalid (step 446). Then, in step 450, the processing engine 124 issues an acknowledgement signal over the connection 250 to the host unit 122.

If neither the new context nor the current context is valid, flow proceeds directly to step 450, where the processing engine 124 issues an acknowledgement signal over the connection 250 to the host unit 122.

Figure 5:
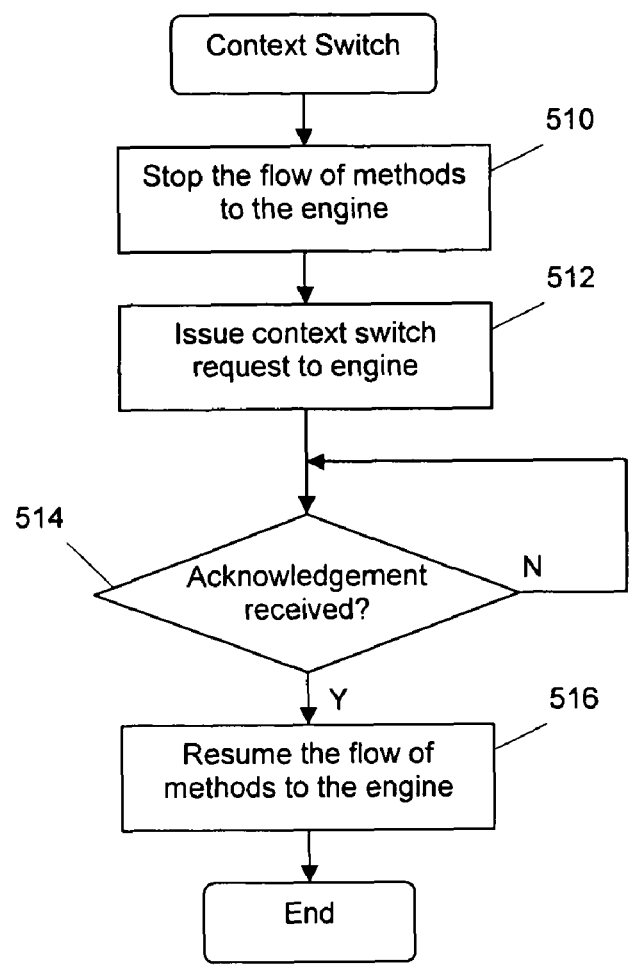
FIG. 5 is a flow diagram that illustrates the process steps carried out by a host unit in connection with a context switch request issued to a processing engine.

FIG. 5 illustrates in a flow diagram the process carried out by the host unit 122 in connection with issuing a context switch request to a processing engine 124 over the connection 220. In step 510, the host unit 122 suspends sending methods (i.e., commands, instructions, and the like) to the processing engine 124 through the connection 210. Then, in step 512, the host unit 122 issues the context switch request over the connection 220. In connection with the request, it sends a pointer to a desired context over the connection 230 and a value of the valid bit over the connection 240 as an indication as to whether the desired context is valid or not. In step 514, the host unit 122 waits for an acknowledgement signal from the processing engine 124 that the context switch request has completed. When the host unit 122 receives the acknowledgement signal from the processing engine 124 over the connection 250, it resumes sending methods to the processing engine 124 (step 516). When the host unit 122 issues context switch requests in the above manner, it ensures that no more than one context switch request will be pending at a time per processing engine.

While the foregoing is directed to embodiments of the present invention, other and further embodiments of the invention may be devised without departing from the basic scope thereof. The scope of the present invention is determined by the claims that follow.

What is claimed is:

1. A method for carrying out a request from a host unit to context switch from a current context to a new context, comprising the steps of:
   receiving at a processing engine the request that includes a new context identifier;
   comparing at the processing engine a current context identifier and the new context identifier; and
   if the current context identifier and the new context identifier are not equal, switching the context of the processing engine from the current context to the new context and issuing from the processing engine an acknowledgement to the host unit that the request has completed after the step of switching.

2. The method according to claim 1, wherein the step of switching comprises the steps of:
   storing states associated with the current context into memory; and
   retrieving states associated with the new context from memory.

3. The method according to claim 1 wherein the request further includes an indication as to whether the new context is valid or not.

4. The method according to claim 1, further comprising the step of issuing an acknowledgement from the processing engine that the request has completed without switching the processing engine from the current context to the next context if the current context identifier and the new context identifier are equal.

5. The method according to claim 1, further comprising the steps of:
   storing the new context identifier as the current context identifier;
   receiving at the processing engine a request to perform another context switch to a new context, the request including a new context identifier;
   comparing the current context identifier and the new context identifier at the processing engine;
   if the current context identifier and the new context identifier are not equal, switching the processing engine from the current context to the new context and issuing from the processing engine an acknowledgement to the host unit that the request has completed; and
   if the current context identifier and the new context identifier are equal, issuing an from the processing engine an acknowledgement that to the host unit that the request has completed without switching from the current context to the new context.

6. A method for managing at a host unit context switches in a processing engine coupled to the host unit, comprising the steps of:
   stopping a flow of instructions from the host unit to the processing engine;
   issuing from the host unit a context switch request that includes a new context identifier to the processing engine;
   comparing at the processing engine a current context identifier and the new context identifier;

switching the context of the processing engine from the current context to the new context, if the current context identifier and the new context identifier are not equal;

receiving at the host unit a context switch acknowledgement from the processing engine upon completion of the context switch request; and restarting the flow of instructions from the host unit to the processing engine upon receiving the context switch acknowledgement.

7. The method according to claim 6, wherein the context switch request includes a pointer to a desired context.

8. The method according to claim 7, wherein the context switch request further includes an indication as to whether the desired context is valid or not.

9. The method according to claim 7, wherein the restarted flow of instructions includes instructions corresponding to the desired context.

10. A computer system comprising:

a host unit for managing context switches;

one or more processing engines coupled to the host unit, each processing engine including a first memory unit for storing a first context identifier received from the host unit with a context switch request that includes a second context identifier and a logic unit for comparing the first context identifier and the second context identifier, wherein the processing engine performs a context switch from the first context to the second context and, after performing the context switch, issues a context switch acknowledgement to the host unit, if the first context identifier is different from the second context identifier.

11. The computer system according to claim 10, wherein the processing engine issues the context switch acknowledgement to the host unit without performing the context switch if the first context identifier is the same as the second context identifier.

12. The computer system according to claim 10, wherein the processing engine further includes a second memory unit for storing an indication as to whether the first context identifier is valid or not, and a third memory unit for storing an indication as to whether the second context identifier is valid or not.

13. The computer system according to claim 12, wherein the context switch request includes the first context identifier to be stored in the first memory unit and the indication to be stored in the second memory unit.

14. The computer system according to claim 12, wherein the processing engine performs a context switch by retrieving states corresponding to a new context using the first context identifier without storing states of a current context if the second context identifier is invalid.

15. The computer system according to claim 12, wherein the processing engine performs a context switch by storing states corresponding to a current context using the second context identifier without retrieving states of a new context if the first context identifier is invalid.

16. The computer system according to claim 10, further comprising a context buffer in which states corresponding different contexts of the processing engine are stored, wherein the processing engine performs a context switch by storing states corresponding to a current context in the context buffer at a location indicated by the second context identifier, and retrieving states corresponding to a new context that was previously stored in the context buffer at a location indicated by the first context identifier.

17. The computer system according to claim 16, wherein the processing engine stores the first context identifier stored in the first memory unit into the second memory unit after performing the context switch but prior to issuing the context switch acknowledgement.

\* \* \* \* \*